(12) United States Patent
Yamamoto et al.

(10) Patent No.: US 11,194,103 B2
(45) Date of Patent: Dec. 7, 2021

(54) OPTICAL CONNECTOR SYSTEM, LOCK MEMBER, OPTICAL CABLE, AND ELECTRONIC DEVICE

(71) Applicant: SONY CORPORATION, Tokyo (JP)

(72) Inventors: Masanari Yamamoto, Kanagawa (JP); Kazuaki Toba, Kanagawa (JP); Ryohei Takahashi, Kanagawa (JP); Shinpei Hirano, Tokyo (JP); Yoshitaka Suzuki, Chiba (JP)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 16/496,953

(22) PCT Filed: May 17, 2018

(86) PCT No.: PCT/JP2018/019056
§ 371 (c)(1),
(2) Date: Sep. 23, 2019

(87) PCT Pub. No.: WO2018/212267
PCT Pub. Date: Nov. 22, 2018

(65) Prior Publication Data
US 2021/0103107 A1    Apr. 8, 2021

(30) Foreign Application Priority Data
May 18, 2017  (JP) .............................. JP2017-099343

(51) Int. Cl.
G02B 6/36 (2006.01)
G02B 6/38 (2006.01)
H01R 13/24 (2006.01)

(52) U.S. Cl.
CPC .......... *G02B 6/3893* (2013.01); *G02B 6/387* (2013.01); *G02B 6/3825* (2013.01); *H01R 13/2421* (2013.01)

(58) Field of Classification Search
CPC ........ G02B 6/3893; G02B 6/387; G02B 6/36; G02B 6/3825; H01R 13/2421
See application file for complete search history.

(56) References Cited

U.S. PATENT DOCUMENTS 7,526,157 B2 * 4/2009 Aldeghi ............... G02B 6/2852
385/32
8,622,762 B2 * 1/2014 Swearingen ........... H01R 24/38
439/248

(Continued)

FOREIGN PATENT DOCUMENTS

CN     105794050 A    7/2016
DE   102013113631 B3  4/2015
(Continued)

OTHER PUBLICATIONS

International Search Report and Written Opinion of PCT Application No. PCT/JP2018/019056, dated Aug. 14, 2018, 10 pages of ISRWO.

*Primary Examiner* — Jennifer Doan
(74) *Attorney, Agent, or Firm* — Chip Law Group

(57) ABSTRACT

A first optical connector, a second optical connector, a first lock member, and a second lock member are equipped. The first optical connector is attached to an electronic device, and corresponds to a receptacle. The second optical connector is attached to an end an optical cable, is fittable to the first optical connector, and corresponds to a plug. The first lock member is attached to the electronic device at a position corresponding to the first optical connector not to prevent fitting of the second optical connector to the first optical connector. The second lock member is attached to the optical cable at a position corresponding to the second optical connector not to prevent fitting of the second optical connector to the first optical connector. The second lock member is fittable to the first lock member in a state of fitting (Continued)

between the first optical connector and the first optical connector.

9 Claims, 11 Drawing Sheets

(56) References Cited

U.S. PATENT DOCUMENTS

| | | |
|---|---|---|
| 2016/0294115 A1 | 10/2016 | Lueckemeier |
| 2017/0052330 A1 | 2/2017 | Lee |
| 2017/0160496 A1 | 6/2017 | De Jong et al. |
| 2019/0041588 A1* | 2/2019 | Bund .................. G02B 6/4471 |

FOREIGN PATENT DOCUMENTS

| | | |
|---|---|---|
| EP | 3078082 A1 | 10/2016 |
| EP | 3201669 A1 | 8/2017 |
| JP | 2017-026845 A | 2/2017 |
| JP | 2017-041435 A | 2/2017 |
| JP | 2017-509097 A | 3/2017 |
| KR | 10-2016-0093708 A | 8/2016 |
| KR | 10-2017-0020980 A | 2/2017 |
| WO | 2015/081929 A1 | 6/2015 |
| WO | 2016/053852 A1 | 4/2016 |
| WO | 2017/179600 A1 | 10/2017 |

\* cited by examiner

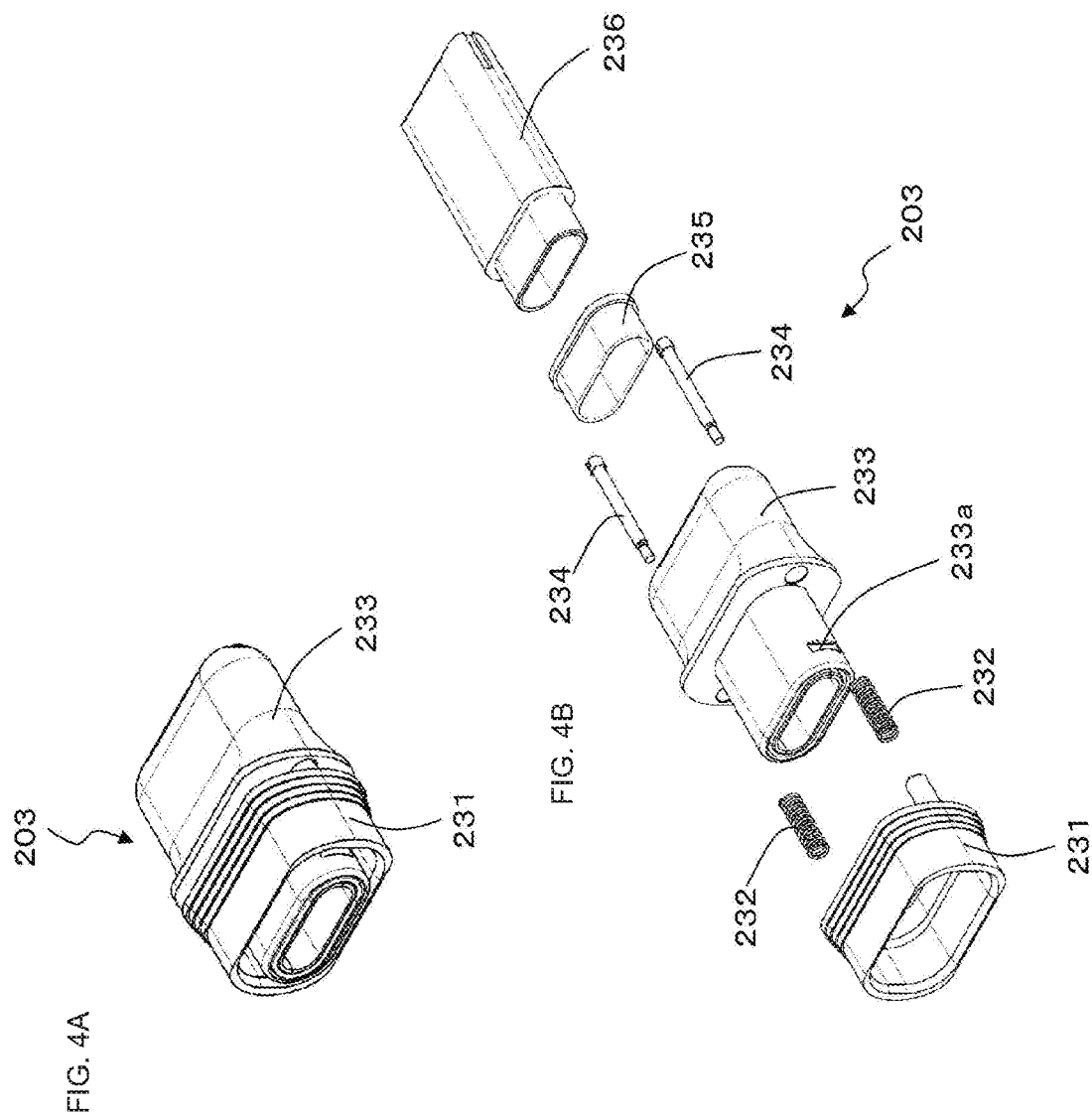

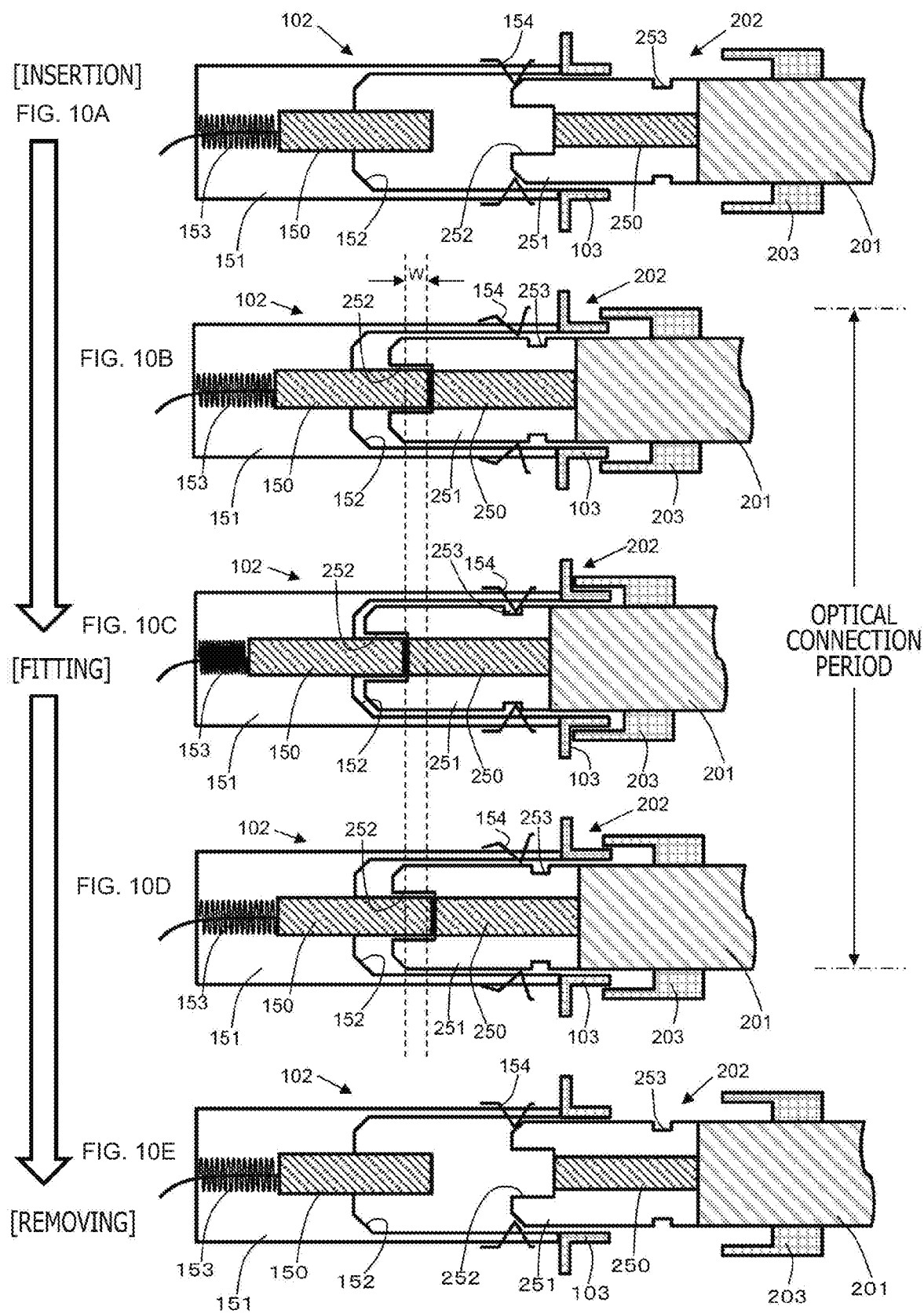

OPTICAL CONNECTOR SYSTEM, LOCK MEMBER, OPTICAL CABLE, AND ELECTRONIC DEVICE

CROSS REFERENCE TO RELATED APPLICATIONS

This application is a U.S. National Phase of International Patent Application No. PCT/JP2018/019056 filed on May 17, 2018, which claims priority benefit of Japanese Patent Application No. JP 2017-099343 filed in the Japan Patent Office on May 18, 2017. Each of the above-referenced applications is hereby incorporated herein by reference in its entirety.

TECHNICAL FIELD

The present technology relates to an optical connector system, an electronic device, a cable, and a lock member for optical data transmission.

BACKGROUND ART

Optical transmission is expected to be used also for consumer devices in the future with a recent rapid increase in a communication capacity. For user protection, a connector (plug) of a cable used for data transmission between consumer devices has a structure removable from a device to prevent a user from facing a danger when the user accidentally caught by a cable.

Meanwhile, data to be recorded, control system data, and others are frequently transmitted to commercial devices including personal computers, servers and the like. Therefore, easy disconnection between devices may cause corruption of important data or disturb a normal operation of system control. Accordingly, a connector of a cable used for transmission has a structure achieving firm attachment (locking) to a device.

Consequently, the structure of the connector of the cable for the consumer device and the structure of the connector of the cable for the commercial device are therefore variable in accordance with purposes of use, and are required to be purchased for each purpose of use even when the connectors to be purchased are produced under an identical standard. On the other hand, a boundary between the consumer device and the commercial device is decreasing with an increase in sophistication of information devices. Accordingly, it has been an issue to be solved to develop a connector which is easily detachable and has high robustness regardless of purposes of use.

For example, PTL 1 describes an adaptor cover which includes a lock unit locking an optical fiber connector. This lock unit is allowed to be attached afterward to an adaptor which has a lock mechanism for locking the optical fiber connector. In the case of this structure, a shoulder portion included in a connector housing of the optical fiber connector is locked, in a state where the optical fiber connector has been fitted to the adaptor, by using a lock projection provided at a distal end of an elastic lock arm equipped inside the adaptor cover attached to the adapter.

CITATION LIST

Patent Literature

[PTL 1]
Japanese Patent Laid-Open No. 2013-114221

SUMMARY

Technical Problems

In the case of the adaptor cover described in PTL 1, the adaptor cover is required to have strict component accuracy to attach the adaptor cover to the adaptor afterward and firmly lock the optical fiber connector, because a lock structure is a structure as described above.

Moreover, in the case of the adaptor cover described in PTL 1, the optical fiber connector is always locked by the adaptor cover in the state where the optical fiber connector has been fitted to the adaptor after attachment of the adaptor cover to the adaptor. Accordingly, the adaptor cover needs to be removed in a case where a user accidentally caught by an optical fiber and desires removing of the optical fiber connector from the adaptor.

Furthermore, in the case of the adaptor cover described in PTL 1, the optical fiber connector is locked without removing in the state where the optical fiber connector has been fitted to the adaptor. However, no consideration is given to a structure possible of easily releasing the lock in a case where removing of the optical fiber connector is needed afterward.

An object of the present technology is to provide a lock mechanism of an optical connector suited for practical use and having robustness.

Solution to Problems

A concept of the present technology is directed to an optical connector system including:
a first optical connector attached to an electronic device;
a second optical connector attached to an end portion of an optical cable, and fittable to the first optical connector;
a first lock member attached to the electronic device at a position corresponding to the first optical connector in such a manner as not to prevent fitting of the second optical connector to the first optical connector; and
a second lock member attached to the optical cable at a position corresponding to the second optical connector in such a manner as not to prevent fitting of the second optical connector to the first optical connector, and fittable to the first lock member in a state of fitting between the first optical connector and the second optical connector.

According to the present technology, the first optical connector, the second optical connector, the first lock member, and the second lock member are equipped. The first optical connector is attached to the electronic device, and corresponds to a so-called receptacle. The second optical connector is attached to the end portion of the optical cable, is fittable to the first optical connector, and corresponds to a so-called plug.

The first lock member is attached to the electronic device at the position corresponding to the first optical connector in such a manner as not to prevent fitting of the second optical connector to the first optical connector. Moreover, the second lock member is attached to the optical cable at the position corresponding to the second optical connector in such a manner as not to prevent fitting of the second optical connector to the first optical connector. Furthermore, the second lock member is fittable to the first lock member in the state of fitting between the first optical connector and the second optical connector.

According to the present technology, as described above, the first lock member is attached to the electronic device, while the second lock member is attached to the optical cable. The first lock member and the second lock member are fitted to each other in the state of fitting between the first optical connector and the second optical connector. Accordingly, accidental removing of the second optical connector of the optical cable from the first optical connector of the electronic device is avoidable.

Note that a following configuration may be adopted in the present technology, for example. An optical unit of the first optical connector comes into a state of contact with an optical unit of the second optical connector at the time of fitting between the first optical connector and the second optical connector. The optical unit of the first optical connector is movable in a fixed range while maintaining the state of contact with the optical unit of the second optical connector. In this configuration, highly accurate attachment using a jig or the like is not required for attachment of the second lock member of the optical cable fitted to the first lock member of the electronic device.

Moreover, note that a following configuration may be adopted in the present technology, for example. At the time of fitting between the first lock member and the second lock member, a lock protrusion of the first lock member is inserted into a lock recess of the second lock member, the insertion state being maintained by pressing the lock protrusion of the first lock member in the insertion direction using a movable portion of the second lock member. A cross section of the optical cable has an elliptical shape. The second lock member includes coil springs that are disposed at positions on both sides of long sides of the ellipse, and each apply an urging force for maintaining the pressing state to the movable portion.

In this case, a user is capable of releasing the state that the movable portion of the second lock member presses the lock protrusion of the first lock member in the insertion direction by moving the movable portion while resisting the urging forces of the coil springs. Accordingly, the user is capable of easily releasing the fitting state between the first lock member and the second lock member, i.e., a locked state. Moreover, size reduction of the second lock member is achievable by the configuration which includes the coil springs that are disposed at the positions on both sides of the long sides of the elliptical shape of the cross section of the cable, and each apply the urging force for maintaining the pressing state to the movable portion.

Another concept of the present technology is directed to an optical connector system including:

an optical connector attached to an end portion of an optical cable; and a lock member attached to the optical cable at a position corresponding to the optical connector in a state where the optical cable penetrates the lock member, in which
 a cross section of the optical cable has an elliptical shape,
 the lock member includes
 a fixed portion fixed to the optical cable,
 a movable portion for maintaining a locked state, and
 coil springs each applying an urging force to the movable portion,
 the coil springs being disposed on both sides of long sides of the ellipse.

According to the present technology, the optical connector, and the lock member are equipped. The optical connector is attached to the end portion of the optical cable. The lock member is attached to the optical cable at the position corresponding to the optical connector in the state where the optical cable penetrates the lock member. The cross section of the optical cable herein has an elliptical shape. In addition, the lock member has a structure which includes the fixed portion fixed to the optical cable, the movable portion for maintaining the locked state, and the coil springs each applying the urging force to the movable portion. The coil springs are disposed on both sides of the long sides of the ellipse.

According to the present technology, as described above, the lock member is attached to the optical cable at the position corresponding to the optical connector in the state where the optical cable penetrates the lock member. When the lock member is attached to the electronic device at the position corresponding to the optical connector, the lock members can be fitted to each other in the state that the optical connector of the optical cable is fitted to the optical connector of the electronic device. Accordingly, accidental removing of the optical connector of the optical cable from the optical connector of the electronic device is avoidable.

Moreover, according to the present technology, the lock member is attached to the optical cable at the position corresponding to the optical connector in the state where the optical cable penetrates the lock member. Accordingly, the optical connector of the optical cable can be fitted to an optical connector of an electronic device to which the lock member is not attached without the necessity of detaching the lock member.

Furthermore, according to the present technology, the lock member has a structure which includes the fixed portion fixed to the optical cable, the movable portion for maintaining the locked state, and the coil springs each applying the urging force to the movable portion. The coil springs are disposed on both sides of the long sides of the elliptical shape of the cross section of the optical cable. Accordingly, the user is capable of easily releasing the locked state by moving the movable portion while resisting the urging forces of the coil springs. In addition, size reduction of the lock member is achievable.

Furthermore, a further concept of the present technology is directed to an optical connector system including:

an optical connector attached to an electronic device; and a lock member attached to the electronic device at a position corresponding to the optical connector in such a manner as to face the optical connector, in which
 a cross section of an optical cable to an end of which an optical connector fitted to the optical connector is attached has an elliptical shape,
 the lock member includes
 a spring member that includes lock protrusions disposed at positions on both sides of long sides of the ellipse.

According to the present technology, the optical connector, and the lock member are equipped. The optical connector is attached to the electronic device. The lock member is attached to the electronic device at the position corresponding to the optical connector in such a manner as to desire the optical connector. The cross section of the optical cable to the end of which the optical connector fitted to the optical connector is attached has an elliptical shape. In addition, the lock member includes the spring member that includes lock protrusions disposed at the positions on both sides of the long sides of the ellipse.

According to the present technology, as described above, the lock member is attached to the electronic device at the position corresponding to the optical connector in such a manner as to desire the optical connector. When the lock member is attached to the optical cable at the position corresponding to the optical connector, the lock members can be fitted to each other in the state that the optical connector of the optical cable is fitted to the optical connector of the electronic device. Accordingly, accidental removing of the optical connector of the optical cable from the optical connector of the electronic device is avoidable.

Moreover, according to the present technology, the lock member is attached to the optical cable at the position corresponding to the optical connector in such a manner as to desire the optical connector. Accordingly, the optical connector of the electronic device can be fitted to an optical connector of an optical cable to which the lock member is not attached without the necessity of detaching the lock member.

Furthermore, a still further concept of the present technology is directed to a lock member used while attached to an optical cable to an end portion of which an optical connector is attached, the lock member being attached to the optical cable at a position corresponding to the optical connector in a state where the optical cable penetrates the lock member, in which a cross section of the optical cable has an elliptical shape,
the lock member includes
a fixed portion fixed to the optical cable,
a movable portion for maintaining a locked state, and
coil springs each applying an urging force to the movable portion,
the coil springs being disposed at positions on both sides of long sides of the ellipse.

The lock member according to the present technology is used while attached to the optical cable to the end portion of which the optical connector is attached. The lock member is attached to the optical cable at the position corresponding to the optical connector in the state where the optical cable penetrates the lock member. The cross section of the optical cable herein has an elliptical shape. The lock member includes the fixed portion fixed to the optical cable, the movable portion for maintaining the locked state, and the coil springs each applying the urging force to the movable portion. The coil springs are disposed at the positions on both sides of the long sides of the ellipse.

As described above, the lock member of the present technology is used while attached to the optical cable to the end portion of which the optical connector is attached. The lock member is attached to the optical cable at the position corresponding to the optical connector in the state where the optical cable penetrates the lock member. Therefore, when the lock member is attached to the electronic device at the position corresponding to the optical connector in the state the lock member is attached to the optical cable, the lock members can be fitted to each other in the state that the optical connector of the optical cable is fitted to the optical connector of the electronic device. Accordingly, accidental removing of the optical connector of the optical cable from the optical connector of the electronic device is avoidable.

Moreover, the lock member of the present technology has a structure which includes the fixed portion fixed to the optical cable, the movable portion for maintaining the locked state, and the coil springs each applying the urging force to the movable portion. The coil springs are disposed at the positions on both sides of the long sides of the elliptical shape of the cross section of the optical cable. Accordingly, the user is capable of easily releasing the locked state by moving the movable portion while resisting the urging forces of the coil springs. In addition, size reduction of the lock member is achievable.

Furthermore, a still further concept of the present technology is directed to a lock member used while attached to an electronic device to which an optical connector is attached, the lock member being attached to the electronic device at a position corresponding to the optical connector in such a state as to face the optical connector, in which a cross section of an optical cable to an end of which an optical connector fitted to the optical connector is attached has an elliptical shape
the lock member including:
a spring member including lock protrusions disposed at positions on both sides of long sides of the ellipse.

The lock member according to the present technology is used while attached to the electronic device to which the optical connector is attached. The lock member is attached to the electronic device at the position corresponding to the optical connector in such a state as to face the optical connector. The cross section of the optical cable to the end of which the optical connector fitted to the optical connector herein is attached has an elliptical shape. In addition, the lock member includes the spring member including the lock protrusions disposed at the positions on both sides of the long sides of the ellipse.

As described above, the lock member according to the present technology is used while attached to the electronic device to which the optical connector is attached. The lock member is attached to the electronic device at the position corresponding to the optical connector in such a state as to face the optical connector. Therefore, when the lock member is attached to the optical cable at the position corresponding to the optical connector in the state the lock member is attached to the electronic device, the lock members can be fitted to each other in the state that the optical connector of the optical cable is fitted to the optical connector of the electronic device. Accordingly, accidental removing of the optical connector of the optical cable from the optical connector of the electronic device is avoidable.

Furthermore, a still further concept of the present technology is directed to an optical cable having an optical connector attached to an end portion of the optical cable and a lock member attached to the optical cable at a position corresponding to the optical connector in a state where a cable body penetrates the lock member, in which a cross section of the cable body has an elliptical shape,
the lock member includes
a fixed portion fixed to the cable body,
a movable portion for maintaining a locked state, and
coil springs each applying an urging force to the movable portion,
the coil springs being disposed on both sides of long sides of the ellipse.

According to the optical cable of the present technology, the optical connector is attached to the end portion of the optical cable. The lock member is attached to the optical cable at the position corresponding to the optical connector in the state where the cable body penetrates the lock member. The cross section of the cable body herein has an elliptical shape. The lock member has a structure which includes the fixed portion fixed to the cable body, the movable portion for maintaining the locked state, and the coil springs each applying the urging force to the movable portion. The coil springs are disposed on both sides of the long sides of the ellipse.

According to the optical cable of the present technology as described above, the optical connector is attached to the end portion of the optical cable. The lock member is attached to the optical cable at the position corresponding to the optical connector in the state where the cable body penetrates the lock member. Therefore, when the lock member is attached to the electronic device at the position corresponding to the optical connector, the lock members can be fitted to each other in the state that the optical connector of the optical cable is fitted to the optical connector of the electronic device. Accordingly, accidental removing of the optical connector of the optical cable from the optical connector of the electronic device is avoidable.

Moreover, according to the optical cable of the present technology, the lock member has a structure which includes the fixed portion fixed to the cable body, the movable portion for maintaining the locked state, and the coil springs each applying the urging force to the movable portion. The coil springs are disposed on both sides of the long sides of the elliptical shape of the cross section of the optical cable. Accordingly, the user is capable of easily releasing the locked state by moving the movable portion while resisting the urging forces of the coil springs. In addition, size reduction of the lock member is achievable.

Furthermore, a still further concept of the present technology is directed to an electronic device having an optical connector attached to a housing and a lock member attached to the housing at a position corresponding to the optical connector in such a state as to face the optical connector, in which a cross section of an optical cable to an end of which an optical connector fitted to the optical connector is attached has an elliptical shape, the lock member includes a spring member that includes lock protrusions disposed at positions on both sides of long sides of the ellipse.

According to the electronic device of the present technology, the optical connector is attached to the housing. The lock member is attached to the housing at the position corresponding to the optical connector in such a state as to face the optical connector. The cross section of the optical cable to the end of which the optical connector fitted to the optical connector herein is attached has an elliptical shape. In addition, the lock member includes the spring member that includes the lock protrusions disposed at the positions on both sides of the long sides of the ellipse.

According to the electronic device of the present technology, as described above, the optical connector is attached to the housing. The lock member is attached to the housing at the position corresponding to the optical connector in such a state as to face the optical connector. Therefore, when the lock member is attached to the optical cable at the position corresponding to the optical connector, the lock members can be fitted to each other in the state that the optical connector of the optical cable is fitted to the optical connector of the electronic device. Accordingly, accidental removing of the optical connector of the optical cable from the optical connector of the electronic device is avoidable.

Advantageous Effect of Invention

According to the present technology, a lock mechanism of an optical connector suited for practical use and having robustness can be provided. Advantageous effect described in the present description are presented only by way of example, and advantageous effect to be produced are not limited to these effects, and may include an additional advantageous effect.

BRIEF DESCRIPTION OF DRAWINGS

[0042][FIG. 1]

FIGS. 4A and 4B depict an overall perspective view and an exploded perspective view of a lock member attached to an optical cable.

FIGS. 10A, 10B, 10C, 10D, and 10E depict views explaining respective states in a case of insertion and fitting of the plug into the receptacle, and respective states in a case of removing of the plug from the receptacle to achieve release of fitting.

DESCRIPTION OF EMBODIMENT

An embodiment for carrying out the invention (hereinafter referred to as an "embodiment") will be hereinafter described. Note that the description will be presented in a following order.
1. Embodiment
2. Modification 1. Embodiment

[Configuration of Optical Connector System]

Figure 1:
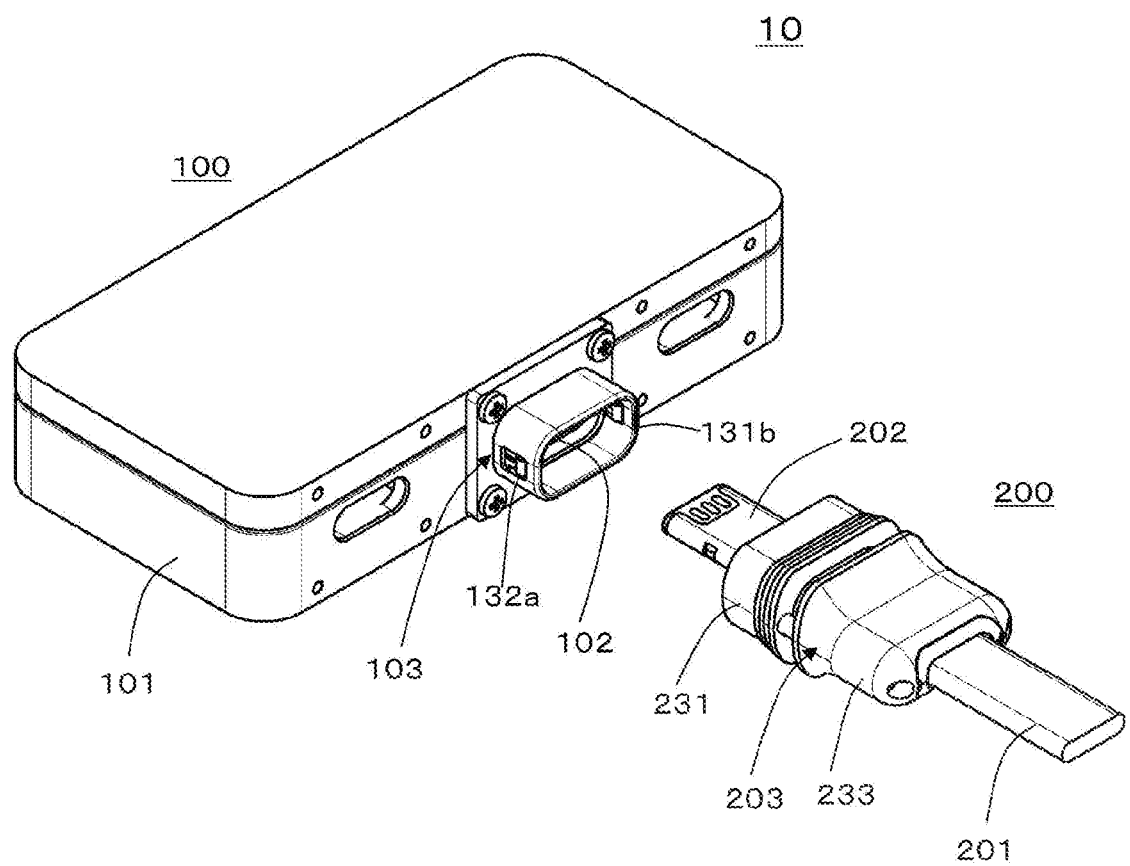
FIG. 1 is a view depicting a configuration example of an optical connector system according to an embodiment.

FIG. 1 depicts a configuration example of an optical connector system 10 according to the embodiment. The optical connector system 10 optically connects an electronic device 100 and an optical cable 200. A receptacle 102 as an optical connector is attached to a housing 101 of the electronic device 100.

In addition, a lock member 103 is attached to the housing 101 at a position corresponding to the receptacle 102 in such a manner as to face the receptacle 102. According to the example depicted in the figure, the lock member 103 is fastened to the housing 101 by screws. Alternatively, the lock member 103 may be bonded to the housing 101.

Figure 2A:
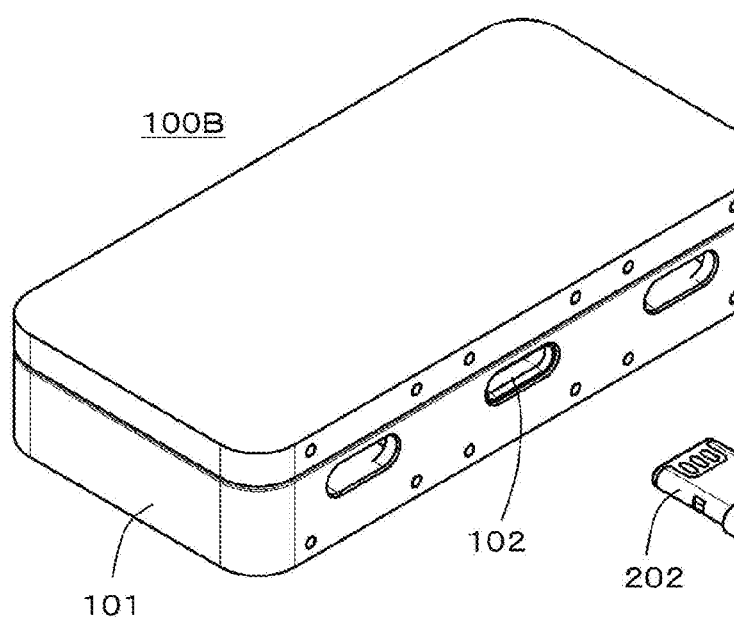
FIGS. 2A and 2B depict views each depicting a configuration example of an optical connector system to which a lock member is not attached.

FIG. 2A depicts an electronic device 100B in a state where the lock member 103 is not attached to the housing 101. The electronic device 100 depicted in FIG. 1 is produced by attaching afterward the lock member 103 to the electronic device 100B in this state.

Returning to FIG. 1, a plug 202 as an optical connector is attached to an end portion of a cable body 201 of the optical cable 200. Moreover, a lock member 203 is attached to the cable body 201 at a position corresponding to the plug 202 in a state where the cable body 201 penetrates the lock member 203.

Figure 2B:
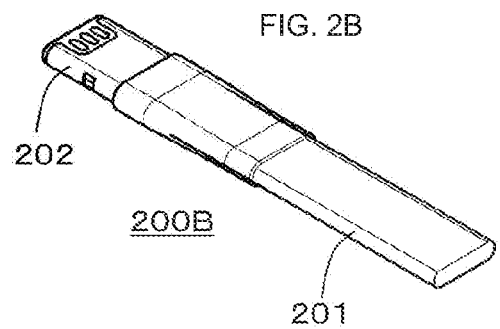

FIG. 2B depicts an optical cable 200B in a state where the lock member 203 is not attached to the cable body 201. The optical cable 200 depicted in FIG. 1 is produced by attaching afterward the lock member 203 to the optical cable 200B in this state.

Figure 3A:
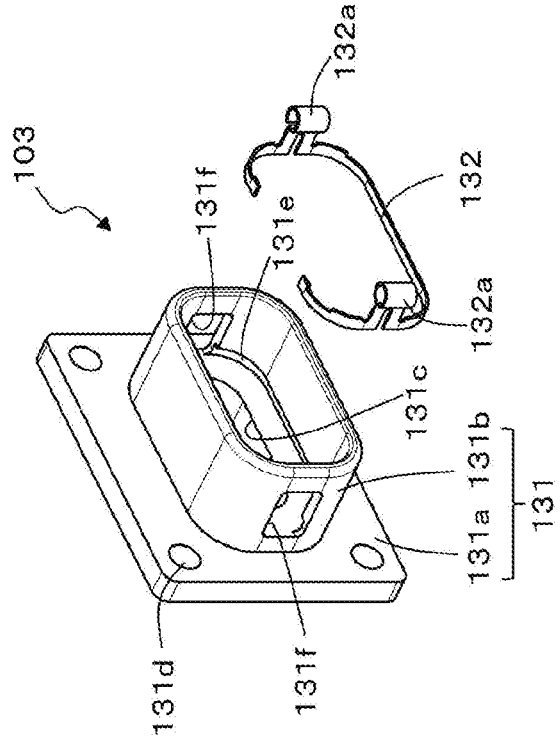
FIGS. 3A and 3B depict an overall perspective view and an exploded perspective view of a lock member attached to an electronic device.
Figure 3B:
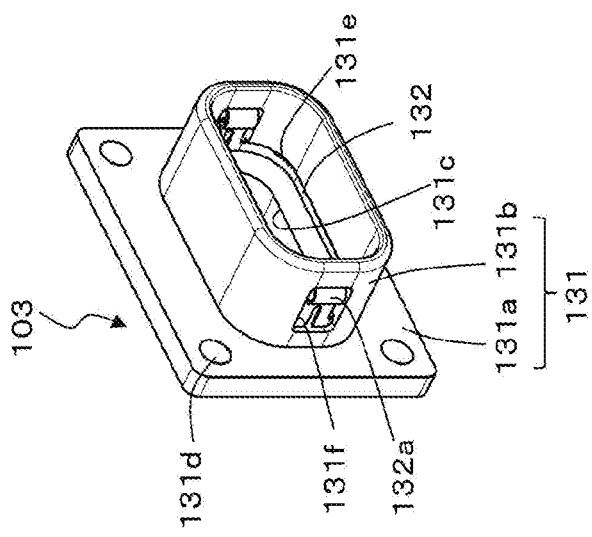

FIG. 3A is an overall perspective view of the lock member 103 of the electronic device 100. FIG. 3B is an exploded perspective view of the lock member 103. The lock member 103 includes a main body 131, and a spring member 132. The main body 131 includes a base portion 131a and an elliptically cylindrical portion 131b. The base portion 131a includes an opening portion 131c which is located at a center and has an elliptical shape coinciding with an opening shape of the receptacle 102. The base portion 131a also includes screw fastening holes 131d at four corners.

The elliptically cylindrical portion 131b stands on the base portion 131a at a position corresponding to the opening portion 131c. A groove 131e to which the spring member 132 is fitted is formed in an entire circumference of the inside of the elliptically cylindrical portion 131b near the opening portion 131c. Moreover, opening portions 131f are formed on both sides of long sides of the ellipse of the elliptically cylindrical portion 131b. The opening portions 131f are formed to position lock protrusions 132a each having a cylindrical shape and provided on the spring member 132.

The spring member 132 has an elliptical ring shape as a whole, and includes the lock protrusions 132a each having a cylindrical shape and disposed on both sides of long sides of the ellipse. In a state where the spring member 132 is fitted to the groove 131e formed inside the elliptically cylindrical portion 131b, a part of each of the lock protrusions 132a each having a cylindrical shape projects inward and outward from the side surface of the elliptically cylindrical portion 131b. This state is maintained by an elastic force.

FIG. 4A depicts an overall perspective view of the lock member 203 of the optical cable 200. FIG. 4B depicts an exploded perspective view of the lock member 203. The lock member 203 includes a slider 231 constituting a movable portion, coil springs 232 each applying an urging force to the movable portion 231, a grip 233 fixed to the cable body 201, shaft screws 234 for attaching the slider 231 to the grip 233 such that the slider 231 is movable, and a gasket 235 and a sleeve 236 each disposed between the grip 233 and the cable body 201 and provided for fixing the grip 233 to the cable body 201.

The lock member 203 is formed such that a cross section of the lock member 203 has a substantially elliptical shape in correspondence with the elliptical shape of the cross section of the cable body 201. In this case, the coil springs 232 are disposed on both sides of long sides of the elliptical shape to reduce the size of the lock member 203. Lock recesses 233a are formed on both sides of long sides of the elliptical shape in the outer surface of the grip 233 on the small radius side.

Figure 5:
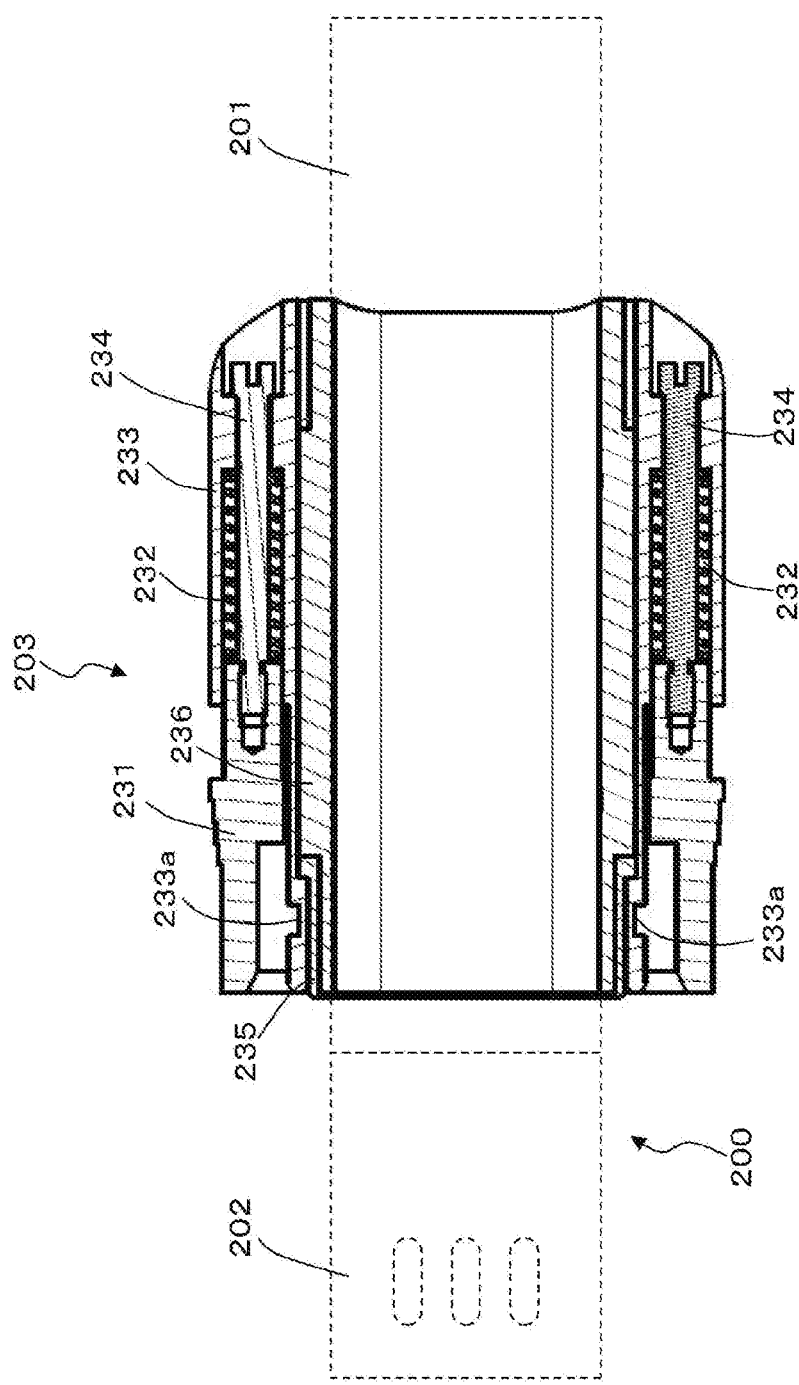
FIG. 5 is a cross-sectional view of the lock member attached to the optical cable.

FIG. 5 depicts a cross section of the lock member 203 taken in the long side direction of the elliptical shape. In FIG. 5, parts corresponding to each part in FIG. 4B are given identical reference numbers to help easy understanding. For example, the grip 233 and the sleeve 236 are bonded to each other, and the sleeve 236 is further bonded to the cable body 201. In this manner, the lock member 203 is fixed to the cable body 201 (the optical cable 200). The slider 231 is constantly held at a position depicted in the figure by the urging force of the coil spring 232. The slider 231 is also movable toward the right in the figure while resisting the urging force of the coil spring 232. Note that the sleeve 236 is not necessarily required, and the grip 233 may be directly fixed to the cable body 201. In addition, the fixing method is not limited to bonding, but may be other methods. Furthermore, the grip 233 may be detachably fixed.

According to the optical connector system 10 depicted in FIG. 1, the plug 202 and the receptacle 102 can be fitted to each other by inserting the plug 202 of the optical cable 200 into the receptacle 102 through the inside of the elliptically cylindrical portion 131b of the lock member 103 of the electronic device 100 in a state where the grip 233 of the lock member 203 of the optical cable 200 is held by a user. In this fitting state, the lock member 203 of the optical cable 200 and the lock member 103 of the electronic device 100 are also fitted to each other and brought into a locked state.

Figure 6:
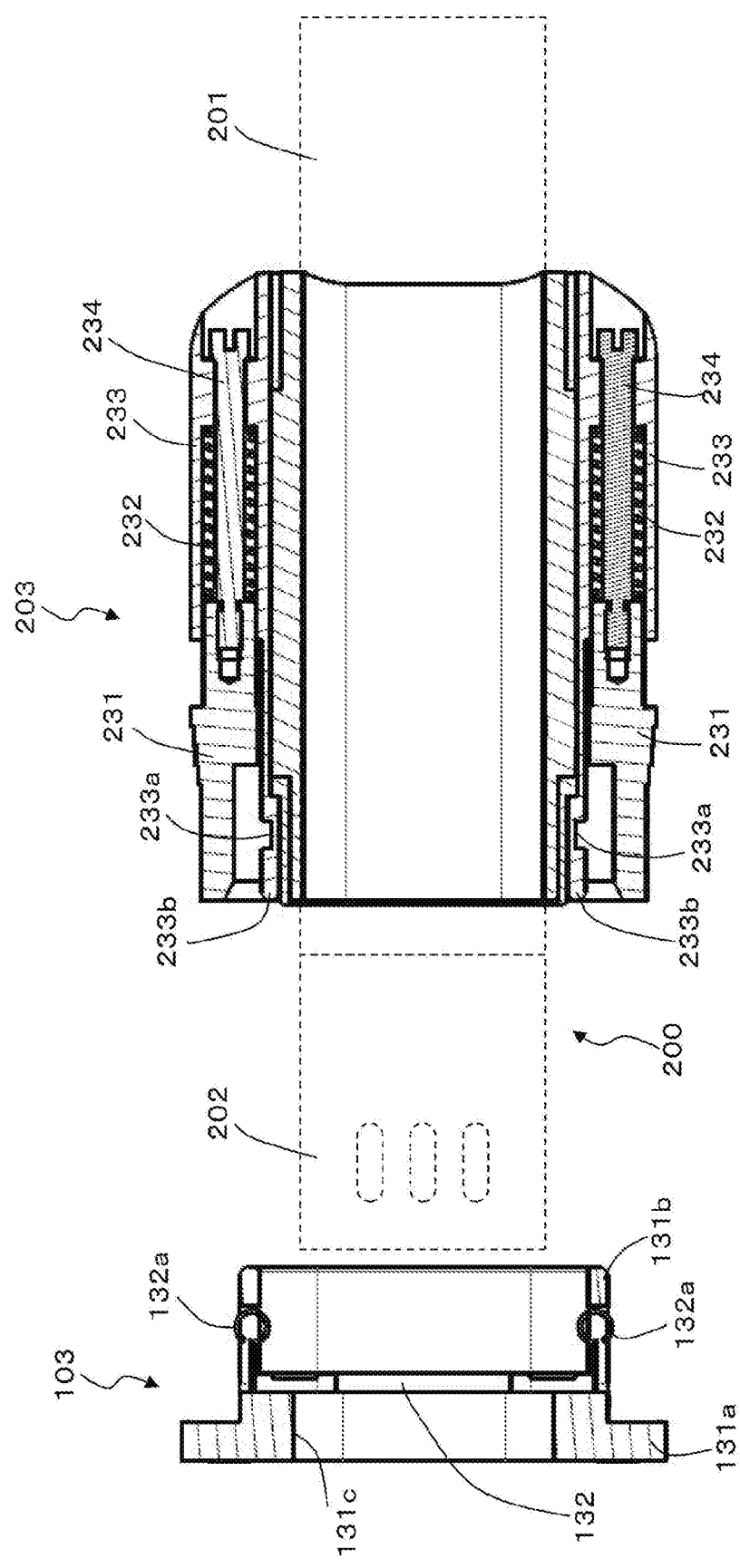
FIG. 6 is a view depicting a state of the lock member of the electronic device and the lock member of the optical cable before fitting.
Figure 7:
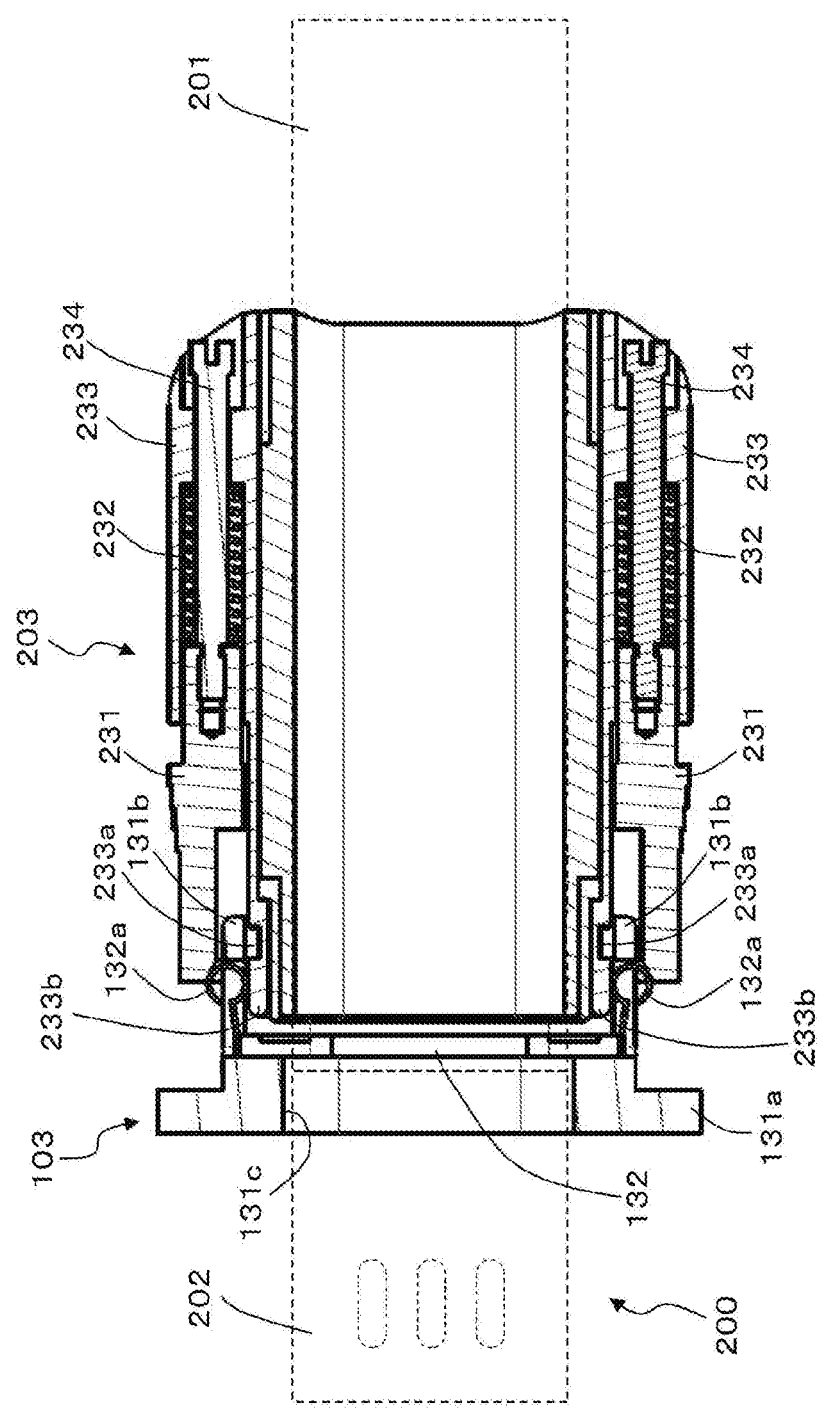
FIG. 7 is a view depicting a state of the lock member of the electronic device and the lock member of the optical cable during fitting.

FIG. 6 depicts a state of the lock member 103 of the electronic device 100 and the lock member 203 of the optical cable 200 before fitting. FIG. 7 depicts a state of the lock member 103 of the electronic device 100 and the lock member 203 of the optical cable 200 during fitting. In the state during fitting, the lock protrusions 132a are pressed by front end portions 233b of the grip 233 and moved outward. In the presence of the lock protrusions 132a moved outward as the above, the slider 231 moves in the direction opposite to the insertion direction in accordance with insertion of the plug 202 while resisting the urging force of the coil spring 232.

Figure 8:
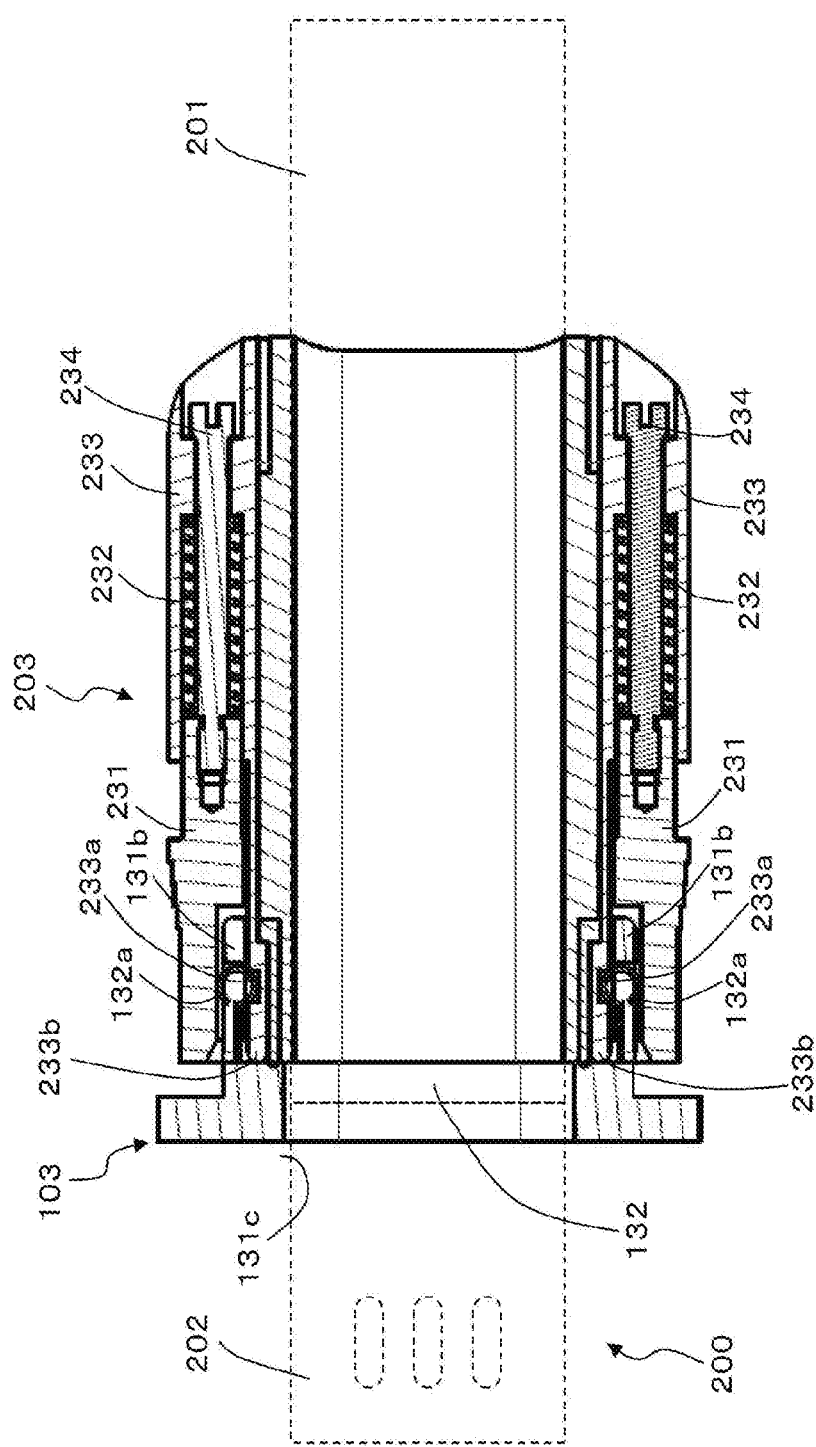
FIG. 8 is a view depicting a state of the lock member of the electronic device and the lock member of the optical cable after fitting.

FIG. 8 depicts a state after fitting the lock member 103 of the electronic device 100 and the lock member 203 of the optical cable 200 in accordance with further insertion of the plug 202 in the state in FIG. 7. In this state after fitting, the lock protrusions 132a are inserted and fitted into the lock recesses 233a of the grip 233, and brought into the locked state. In addition, the condition that the lock protrusions 132a have been moved outward is released in this state, and then the slider 231 returns to the normal position by the urging force of the coil springs 232 as depicted in the figure. In this case, the lock protrusions 132a come into a state pressed by the slider 231 in the insertion direction into the lock recesses 233a, and then the locked state is maintained in a stable manner.

This locked state is released by moving the slider 231 of the lock member 203 of the optical cable 200 in the direction opposite to the insertion direction described above while resisting the urging force of the coil spring 232 in a state that the slider 231 is held by the user. In this case, while not depicted in the figure, the state where the slider 231 presses the lock protrusions 132a toward the lock recesses 233a can be released by the movement of the slider 231. Accordingly, removing is achieved by releasing the locked state.

According to the embodiment, an optical unit of the plug 202 is brought into contact with an optical unit of the receptacle 102 when fitting between the receptacle 102 of the electronic device 100 and the plug 202 of the optical cable 200 is achieved. In this case, the optical unit of the receptacle 102 is configured to be movable in a fixed range while maintaining the state of contact with the optical unit of the plug 202 (floating structure).

Figure 9A:
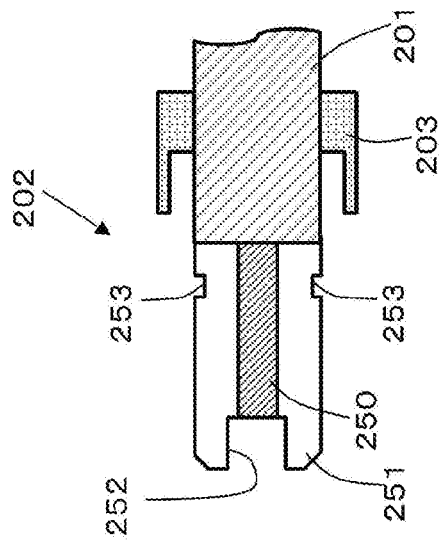
FIGS. 9A and 9B depict views schematically depicting an example of a configuration of a receptacle (optical connector) of the electronic device and an example of a configuration of a plug (optical connector) of the optical cable, respectively.

FIG. 9A schematically depicts an example of a configuration of the receptacle (optical connector) 102 of the electronic device 100 together with the lock member 103. On the other hand, FIG. 9B schematically depicts an example of a configuration of the plug (optical connector) 202 of the optical cable together with the lock member 203.

Figure 9B:
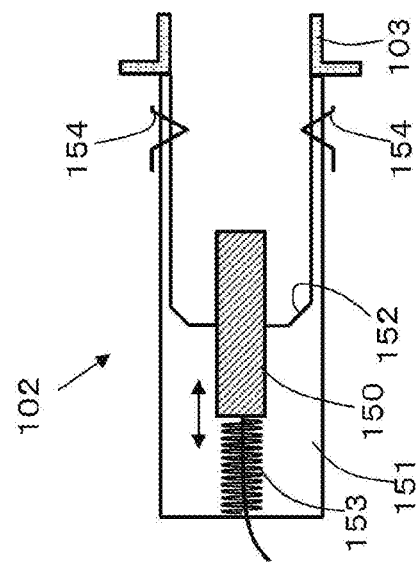

Note that the configurations depicted in FIGS. 9A and 9B are presented only by way of example. The configurations of the receptacle 102 and the plug 202 are not limited to the depicted examples.

The plug 202 of the optical cable 200 depicted in FIG. 9B will be described. The plug 202 includes a main body 251 having an opening 252 at a center on the insertion side. An optical unit 250 is provided in the main body 251 such that an end surface of the optical unit 250 can be viewed through a bottom surface of the opening 252. Moreover, lock holes 253 each constituting a lock mechanism are formed in an outer circumferential surface of the main body 251.

The receptacle 102 depicted in FIG. 9A will be described. The receptacle 102 includes a main body 151 having an opening 152 on the plug 202 side. An optical unit 150 is provided on the main body 151 at a position corresponding to the optical unit 250 of the plug 202. More specifically, the optical unit 150 is provided such that an end portion of the optical unit 150 projects from a bottom center of the opening 152. Furthermore, lock units 154 each constituted by a spring member which is in a mountain-fold state and constitutes a lock mechanism are disposed on a side surface of the opening 152 such that a part of each of the lock units 154 projects.

The optical unit 150 is provided in such a manner as to be movable in a direction of arrows. A spring member 153 having a coil shape and constituting an urging unit is provided on the side opposite to the plug 202 side of the optical unit 150. The optical unit 150 is urged by the spring member 153 in a state without insertion of the optical connector 202, and is located at a position depicted in the figure.

Respective states in a case of insertion and fitting of the plug 202 into the receptacle 102, and respective states in a case of removing of the plug 202 from the receptacle 102 to achieve release of fitting will be described with reference to FIGS. 10A, 10B, 10C, 10D, and 10E.

FIG. 10A depicts a state where insertion of the main body 251 of the plug 202 into the opening 152 of the receptacle 102 has started in accordance with an operation by the user. FIG. 10B depicts a state where the optical unit 150 of the receptacle 102 has started to contact the optical unit 250 of the plug 202 by further insertion of the plug 202 into the opening 152 of the receptacle 102.

FIG. 10C depicts a fitting state where insertion of the main body 251 of the plug 202 into the opening 152 of the receptacle 102 is completed by further insertion of the main body 251 of the plug 202 into the opening 152 of the receptacle 102 while resisting an urging force of the spring member 153. In this state, the lock members 154 are inserted into the lock holes 253. This fitting state is maintained by the urging force of the spring member 153. Note that, in this fitting state, the lock member 103 of the electronic device 100 and the lock member 203 of the optical cable 200 are also fitted to each other and brought into a locked state in the example depicted in the figure.

The locked state achieved by insertion of the lock members 154 into the lock holes 253 is also released when the user releases fitting between the lock member 103 and the lock member 203 in the fitting state depicted in FIG. 10C, and performs an operation of removing in such a direction as to remove the plug 202 from the opening 152 of the receptacle 102.

By releasing the locked state in this manner, the optical unit 150 of the receptacle 102 moves by the urging force of the spring member 153, and continues movement to come into a state depicted in FIG. 10D. FIG. 10E depicts a state where the user performs an operation of removing in the state depicted in FIG. 10D in the direction of further removing the plug 202 from the receptacle 102. In this state, the optical unit 150 of the receptacle 102 and the optical unit 250 of the plug 202 are in a state of no contact with each other.

As described above, the optical unit 150 of the receptacle 102 is configured to be movable in a fixed range W while maintaining the state of contact with the optical unit 250 of the plug 202 (floating structure). Accordingly, while described above is a case where the lock member 203 of the optical cable 200 is fitted to the lock member 103 of the electronic device 100 and brought into the locked state in the fitting state depicted in FIG. 10C, the lock member 203 may be fitted to the lock member 103 and brought into the locked state at any position as long as the optical unit 150 of the receptacle 102 lies within the fixed range W where the optical unit 150 maintains the state of contact with the optical unit 250 of the plug 202.

In this case, positional accuracy required for attaching the lock member 203 to the cable body 201 is reduced by the configuration which allows movement of the optical unit 150 of the receptacle 102 in the fixed range W while maintaining the state of contact between the optical unit 150 and the optical unit 250 of the plug 202. Accordingly, the necessity of attachment with high accuracy using a jig or the like is eliminated, and attachment is easily achievable by an ordinary user.

As described above, according to the optical connector system 10 depicted in FIG. 1, the lock member 103 is attached to the electronic device 100 in correspondence with the receptacle 102, while the lock member 203 is attached to the optical cable 200 in correspondence with the plug 202. The lock member 103 and the lock member 203 are fitted to each other in a fitted state between the receptacle 102 and the plug 202. Accordingly, accidental removing of the plug 202 of the optical cable 200 from the receptacle 102 of the electronic device 100 is avoidable.

Moreover, according to the optical connector system 10 depicted in FIG. 1, the optical unit 150 of the receptacle 102 is brought into a state of contact with the optical unit 250 of the plug 202 at the time of fitting between the receptacle 102 of the electronic device 100 and the plug 202 of the optical cable 200. The optical unit 150 is movable in the fixed range W while maintaining this state. Therefore, positional accuracy required for attaching the lock member 203 to the optical cable 200 can be reduced, and thus the necessity of attachment with high accuracy using a jig or the like is eliminated. Accordingly, attachment is easily achievable by an ordinary user.

Furthermore, according to the configuration of the optical connector system 10 depicted in FIG. 1, the cross-sectional shape of the lock member 203 attached to the optical cable 200 has a substantially elliptical shape similarly to the cross-sectional shape of the optical cable 200. In addition, the coil springs 232 each applying an urging force to the slider 231 are disposed at positions on both sides of long sides of the elliptical shape. Accordingly, size reduction of the lock member 203 is achievable.

2. Modification

Note that the lock members are provided on both the electronic device 100 and the optical cables 200 according to the optical connector system 10 depicted in FIG. 1. However, optical transmission is achievable by fitting the plug 202 of the optical cable 200 to the receptacle 102 of the electronic device 100 even in a state where the lock member is attached to only either one of the electronic device 100 and the optical cable 200.

This configuration is adoptable for a following reason. The lock member 103 is attached to the electronic device 100 in such a manner as to face the receptacle 102, and the lock member 203 is attached to the optical cable 200 in a state that the optical cable 200 penetrates the lock member 203.

Figure 11A:
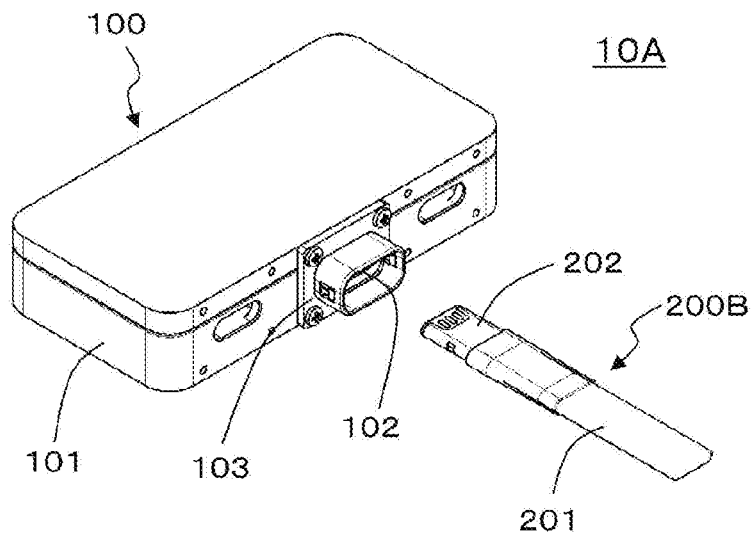
FIGS. 11A and 11B depict views each depicting another configuration example of the optical connector system.
Figure 11B:
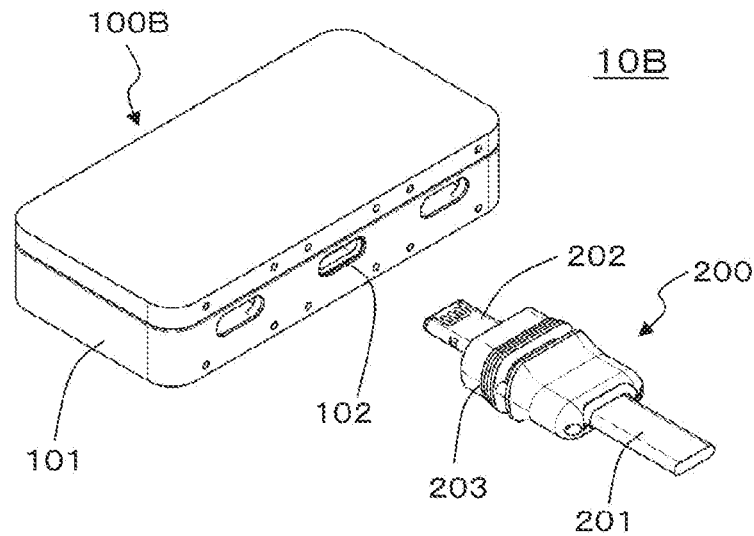

For example, FIG. 11A depicts an optical connector system 10A which includes a combination of the electronic device 100 to which the lock member 103 is attached, and an optical cable 200B to which the lock member 203 is not attached. FIG. 11B depicts an optical connector system 10B which includes a combination of an electronic device 100B to which the lock member 103 is not attached, and the optical cable 200 to which the lock member 203 is attached.

In addition, the present technology may have following configurations.

(1)

An optical connector system including:

a first optical connector attached to an electronic device;

a second optical connector attached to an end portion of an optical cable, and fittable to the first optical connector;

a first lock member attached to the electronic device at a position corresponding to the first optical connector in such a manner as not to prevent fitting of the second optical connector to the first optical connector; and a second lock member attached to the optical cable at a position corresponding to the second optical connector in such a manner as not to prevent fitting of the second optical connector to the first optical connector, and fittable to the first lock member in a state of fitting between the first optical connector and the second optical connector.

(2)

The optical connector system according to (1) described above, in which an optical unit of the first optical connector comes into a state of contact with an optical unit of the second optical connector at the time of fitting between the first optical connector and the second optical connector, and the optical unit of the first optical connector is movable in a fixed range while maintaining the state of contact with the optical unit of the second optical connector.

(3)

The optical connector system according to (1) or (2) described above, in which at the time of fitting between the first lock member and the second lock member, a lock protrusion of the first lock member is inserted into a lock recess of the second lock member, the insertion state being maintained by pressing the lock protrusion of the first lock member in the insertion direction using a movable portion of the second lock member, a cross section of the optical cable has an elliptical shape, and the second lock member includes coil springs that are disposed at positions on both sides of long sides of the ellipse, and each apply an urging force for maintaining the pressing state to the movable portion.

(4)

An optical connector system including:

an optical connector attached to an end portion of an optical cable; and a lock member attached to the optical cable at a position corresponding to the optical connector in a state where the optical cable penetrates the lock member, in which a cross section of the optical cable has an elliptical shape, the lock member includes a fixed portion fixed to the optical cable, a movable portion for maintaining a locked state, and coil springs each applying an urging force to the movable portion, the coil springs being disposed on both sides of long sides of the ellipse.

(5)

An optical connector system including:

an optical connector attached to an electronic device; and a lock member attached to the electronic device at a position corresponding to the optical connector in such a manner as to face the optical connector, in which a cross section of an optical cable to an end of which an optical connector fitted to the optical connector is attached has an elliptical shape, the lock member includes a spring member that includes lock protrusions disposed at positions on both sides of long sides of the ellipse.

(6)

A lock member used while attached to an optical cable to an end portion of which an optical connector is attached, the lock member being attached to the optical cable at a position corresponding to the optical connector in a state where the optical cable penetrates the lock member, in which a cross section of the optical cable has an elliptical shape, the lock member includes a fixed portion fixed to the optical cable, a movable portion for maintaining a locked state, and coil springs each applying an urging force to the movable portion, the coil springs being disposed at positions on both sides of long sides of the ellipse.

(7)

A lock member used while attached to an electronic device to which an optical connector is attached, the lock member being attached to the electronic device at a position corresponding to the optical connector in such a state as to face the optical connector, in which a cross section of an optical cable to an end of which an optical connector fitted to the optical connector is attached has an elliptical shape, the lock member including:

a spring member including lock protrusions disposed at positions on both sides of long sides of the ellipse.

(8)

An optical cable having an optical connector attached to an end portion of the optical cable and a lock member attached to the optical cable at a position corresponding to the optical connector in a state where a cable body penetrates the lock member, in which a cross section of the cable body has an elliptical shape, the lock member includes a fixed portion fixed to the cable body, a movable portion for maintaining a locked state, and coil springs each applying an urging force to the movable portion, the coil springs being disposed on both sides of long sides of the ellipse.

(9)

An electronic device having an optical connector attached to a housing and a lock member attached to the housing at a position corresponding to the optical connector in such a state as to face the optical connector, in which a cross section of an optical cable to an end of which an optical connector fitted to the optical connector is attached has an elliptical shape,
the lock member includes
a spring member that includes lock protrusions disposed at positions on both sides of long sides of the ellipse.

REFERENCE SIGNS LIST 10, 10A, 10B . . . Optical connector system
100, 100B . . . Electronic device
101 . . . Housing
102 . . . Receptacle (optical connector)
103 . . . Lock member
131 . . . Main body
131a . . . Base portion
131b . . . Elliptically cylindrical portion
131c . . . Opening portion
131d . . . Screw fastening hole
131e . . . Groove
131f . . . Opening portion
132 . . . Spring member
132a . . . Lock protrusion
150 . . . Optical unit
151 . . . Main body
152 . . . Opening
153 . . . Spring member having coil shape
154 . . . Lock unit
200, 200B . . . Optical cable
201 . . . Cable body
202 . . . Plug (optical connector)
203 . . . Lock member
231 . . . Slider
232 . . . Coil spring
233 . . . Grip
233a . . . Lock recess
233b . . . Distal end portion
234 . . . Shaft screw
235 . . . Gasket
236 . . . Sleeve
250 . . . Optical unit
251 . . . Main body
252 . . . Opening
253 . . . Lock hole

The invention claimed is:

1. An optical connector system, comprising:
a first optical connector attached to an electronic device;
a second optical connector attached to an end portion of an optical cable, wherein the second optical connector is fittable to the first optical connector;
a first lock member attached to the electronic device at a position corresponding to the first optical connector in a configuration which does not prevent fitting of the second optical connector to the first optical connector; and
a second lock member attached to the optical cable at a position corresponding to the second optical connector in a configuration which does not prevent fitting of the second optical connector to the first optical connector, wherein the second lock member fits to the first lock member in a state of fitting between the first optical connector and the second optical connector.

2. The optical connector system according to claim 1, wherein
an optical unit of the first optical connector comes into contact with an optical unit of the second optical connector at a time of fitting between the first optical connector and the second optical connector, and
the optical unit of the first optical connector is movable in a fixed range while maintaining the contact with the optical unit of the second optical connector.

3. The optical connector system according to claim 1, wherein
at a time of fitting between the first lock member and the second lock member, a lock protrusion of the first lock member is inserted into a lock recess of the second lock member,
a state of the insertion of the lock protrusion into the lock recess is maintained by pressing the lock protrusion of the first lock member in a direction of the insertion using a movable portion of the second lock member,
a cross section of the optical cable has an elliptical shape,
the second lock member includes a plurality of coil springs at positions on both sides of long sides of a cross section of the second lock member which has an elliptical shape corresponding to the elliptical shape of the optical cable, and
each coil spring of the plurality of coil springs is configured to apply an urging force for maintaining the pressing of the lock protrusion to the movable portion.

4. An optical connector system, comprising:
an optical connector attached to an end portion of an optical cable; and
a lock member attached to the optical cable at a position corresponding to the optical connector in a state where the optical cable penetrates the lock member, wherein
a cross section of the optical cable has an elliptical shape,
the lock member includes:
a fixed portion fixed to the optical cable,
a movable portion configured to maintain a locked state, and
a plurality of coil springs configured to apply an urging force to the movable portion,
wherein
a cross section of the lock member has an elliptical shape corresponding to the elliptical shape of the cross section of the optical cable, and
the plurality of coil springs is on both sides of long sides of the elliptical shaped lock member.

5. An optical connector system, comprising:
a first optical connector attached to an electronic device; and
a lock member attached to the electronic device at a position corresponding to the first optical connector in a configuration to face the first optical connector, wherein
a cross section of an optical cable has an elliptical shape,
one end of the optical cable is attached to a second optical connector fitted to the first optical connector,
the lock member includes a spring member that includes a plurality of lock protrusions,
the spring member has an elliptical shape, and
the plurality of lock protrusions is at positions on both sides of long sides of the elliptical shaped spring member.

6. A lock member used while attached to an optical cable, the lock member comprises:
a fixed portion fixed to the optical cable;
a movable portion configured to maintain a locked state; and a plurality of coil springs configured to apply ach applying an urging force to the movable portion,
wherein
an end portion of the optical cable is attached to an optical connector,
the lock member is attached to the optical cable in a configuration in which the optical cable penetrates the lock member at a position corresponding to the optical connector,
a cross section of the optical cable has an elliptical shape,
a cross section of the lock member has an elliptical shape corresponding to the elliptical shape of the cross section of the optical cable, and
the plurality of coil springs is at positions on both sides of long sides of the elliptical shaped lock member.

7. A lock member attached to an electronic device, to which a first optical connector is attached, the lock member comprising:
a spring member including a plurality of lock protrusions,
wherein
the lock member is attached to the electronic device at a position corresponding to the first optical connector in a state to face the first optical connector,
a cross section of an optical cable has an elliptical shape,
an end of the optical cable is attached to a second optical connector fitted to the first optical connector,
the spring member has an elliptical shape, and
the plurality of lock protrusions is at positions on both sides of long sides of the elliptical shaped spring member.

8. An optical cable, comprising:
an optical connector attached to an end portion of the optical cable,
a cable body; and
a lock member attached to the optical cable at a position corresponding to the optical connector in a state where the cable body penetrates the lock member,
wherein
a cross section of the cable body has an elliptical shape,
the lock member includes:
a fixed portion fixed to the cable body,
a movable portion configured to maintain a locked state, and
a plurality of coil springs configured to apply an urging force to the movable portion,
the plurality of coil springs is on both sides of long sides of a cross section of the lock member which has an elliptical shape corresponding to the elliptical shape of the cross section of the cable body.

9. An electronic device, comprising:
a first optical connector attached to a housing; and
a lock member attached to the housing at a position corresponding to the first optical connector in a state to face the first optical connector, wherein
the first optical connector is fitted to a second optical connector attached to an end of an optical cable,
a cross section of the optical cable has an elliptical shape,
the lock member includes a spring member that includes a plurality of lock protrusions,
the spring member has an elliptical shape, and
the plurality of lock protrusions is at positions on both sides of long sides of the elliptical shaped spring member.

* * * * *